United States Patent [19]

Clowes et al.

[11] Patent Number: 4,644,107

[45] Date of Patent: Feb. 17, 1987

[54] VOICE-CONTROLLED TELEPHONE USING VISUAL DISPLAY

[75] Inventors: Garth A. Clowes, Palo Verdes Estates; James P. Collas, Los Angeles, both of Calif.

[73] Assignee: TTC, Carson, Calif.

[21] Appl. No.: 665,264

[22] Filed: Oct. 26, 1984

[51] Int. Cl.$^4$ ............................................. H04M 1/46
[52] U.S. Cl. .................................... 379/354; 379/216; 379/355
[58] Field of Search ........... 179/90 B, 90 BB, 90 BD, 179/18 B, 90 AN, 18 BA; 381/43, 51

[56] References Cited

U.S. PATENT DOCUMENTS

| | | | |
|---|---|---|---|
| 3,725,602 | 4/1973 | Hoffman | 179/90 R |
| 3,742,143 | 6/1973 | Awipi | 179/SA |
| 3,925,622 | 12/1975 | Robinson | 179/18 BE |
| 3,928,724 | 12/1975 | Byram et al. | 381/43 |
| 4,145,581 | 3/1979 | Stockdale | 179/90 BB |
| 4,158,750 | 6/1979 | Sakoe et al. | 179/SD |
| 4,277,651 | 7/1981 | Fisher, II et al. | 179/90 B |
| 4,327,251 | 4/1982 | Fomenko et al. | 179/18 B |
| 4,348,550 | 9/1982 | Pirz et al. | 179/90 B |
| 4,399,331 | 8/1983 | Brown et al. | 179/5 R |

OTHER PUBLICATIONS

Rabiner et al., "Application of Isolated Word Recognition to a Voice Controlled Repertory Dialer System", *ICASSP Proceedings*, IEEE Conference, Denver, Colo. Apr. 9-11, 1980, pp. 182-185.

Teja, "Repertory Telephone Dialer Responds to Human Voice", *Technology News*, Oct. 20, 1980, vol. 25, No. 19, pp. 57-59.

Blomberg et al., "Let Your Voice Do The Dialing", *Telephony*, May 2, 1983, pp. 68-74.

*Primary Examiner*—Robert G. Lev
*Attorney, Agent, or Firm*—Townsend and Townsend

[57] ABSTRACT

A "dialess" telephone communicates with a user via a visual display to provide readily-understandable cues which permit voice-controlled dialing. A number to be dialed may be spoken digit-by-digit and dialed automatically or a name may be spoken and the telephone will automatically dial the number stored in a user's repertory corresponding to the spoken name. Additions to and changes of names and/or numbers within a user's repertory is accomplished vocally and in response to visually-displayed cues. Up to four users may have independent repertory calling lists stored within a memory of the dialess telephone.

8 Claims, 2 Drawing Figures

Microfiche Appendix Included
(2 Microfiche, 44 Pages)

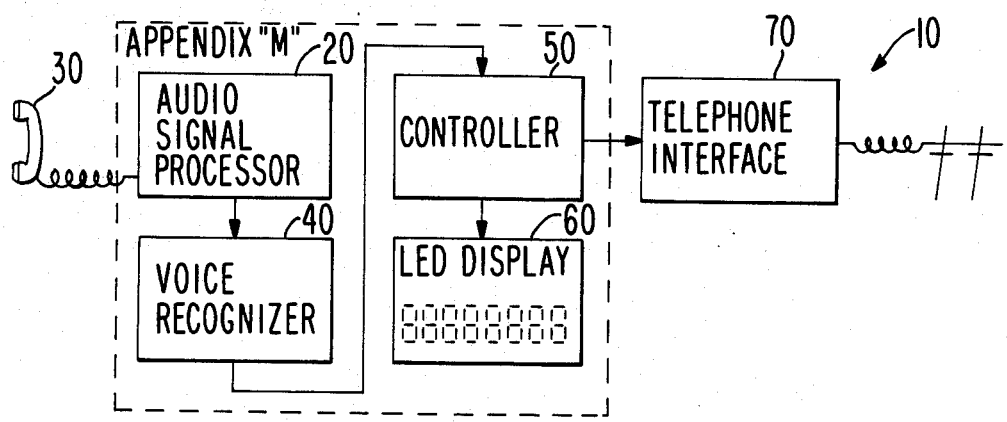
FIG. 1
FIG. 2
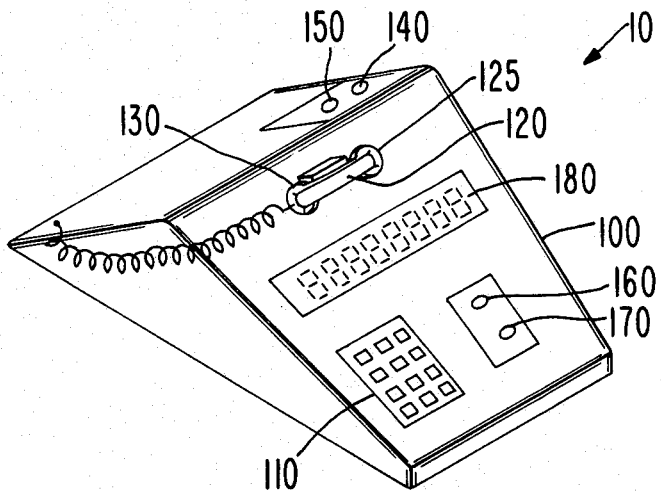

VOICE-CONTROLLED TELEPHONE USING VISUAL DISPLAY

A microfiche Appendix "A" consisting of a target frame (frame zero (0)) followed by three frames accompanies this application which contains detailed pin interconnection schematic of a circuit implementing the voice-controlled telephone of the present invention. Frame one (1) of Appendix "A" includes circuitry which is proprietary with Interstate Electronics Corp., 1001 E. Ball Road, Anaheim, CA 92803 and is used with the permission of Interstate Electronics Corporation.

A microfiche Appendix "B" consisting of a target frame (frame zero (0)) followed by 43 frames also accompanies this application which contains program listings of the various utility routines executed by the microprocessor element of the voice-controlled telephone of the present invention.

This invention relates to voice-controlled apparatus and method of dialing to establish telephonic connections and more particularly to the use of visual displays in such dialing apparatus and method to communicate with the user in a readily-understandable manner.

BACKGROUND OF THE INVENTION

A number of automatic and repertory dialing telephones are known which seek to provide voice-controlled dialing of numbers. Among the limitations of such telephones are the need to manually enter new numbers or changes in numbers into the device, or the absence of "user-friendliness" which makes the use of the device difficult for the uninitiated.

In other devices, a limited form of voice-control is provided which must be coordinated with manual entry of the digits of the number. Further, some spokenword controlled telephones rely on communication with the user via a limited voice synthesized vocabulary which may be difficult to understand and which is prone to unintelligibility in certain high-noise environments or which may be inappropriate where confidential conversations are necessary. In addition, previous devices have been constructed of custom-designed special-purpose components which made them relatively expensive and therefore unavailable to the general public.

SUMMARY OF THE INVENTION

The present invention provides an inexpensive dialess voice-controlled telephone which uses a "calculator" type visual display to communicate with the user in a readily-understandable manner. The device recognizes a number of commands, such as "DIAL", "BACK", "RECALL", and "LEARN" which permit the user to vocally instruct the device as to which operation he or she wishes it to perform. These commands appear on the visual display and prompt the user in the operation of the telephone in a manner which makes the device extremely easy to use even in noisy environments or where the conversation must be confidential. The telephone is constructed from standard integrated circuit chips which results in a reliable and inexpensive device.

According to one aspect of the present invention, there may be up to four different users, each with his or her own stored repertory of names and numbers with no ambiguity resulting from overlapping names between the repertoire. Further each user can vocally select up to 8 names such as "EMILY" to be recognized by the device and vocally instruct that the corresponding number be dialed. Alternatively, a number may be vocalized and directly dialed. In any event, the user receives visual confirmation of his or her vocal instructions.

According to another aspect of the invention, additions and changes of names and/or numbers from a user's repertory is accomplished vocally and in response to visually-displayed cues.

According to yet another aspect of the present invention a command may consist of a sequence of words and numbers such as "SPRINT" followed by the number followed by "CHARGE CODE", which permit the use of alternative communication networks or the making of accounting records regarding time and cost information.

BRIEF DESCRIPTION OF THE DRAWINGS

FIG. 1 is a block diagram illustrating the major functional elements of the voice-controlled telephone with visual display of the present invention.

FIG. 2 illustrates a physical embodiment of the voice-controlled telephone with visual display of the present invention.

DESCRIPTION OF AN ILLUSTRATIVE EMBODIMENT

One implementation of the voice-controlled telephone of the present invention is shown in block diagram form in FIG. 1. The device 10 includes an audio signal processor 20 which receives vocal information from the microphone portion of the telephone handset 30. Audio signal processor 20 consists of a preamplifier, a speech equalizer, a 16-channel analog spectrum analyzer, an 8-bit analog-to-digital (A/D) converter, and associated circuitry. Reference should be had to the detailed pin interconnection circuit diagrams contained on microfiche and appended to the instant application as Appendix "A". The circuit elements shown in the lower portion of the circuit diagram of frame one (1) of Appendix "A", arranged generally right-to-left thereon, and denoted by a dotted rectangle, a dotted five-sided figure, "IC7" and "IC8" thereon, correspond to the preamplifier, speech equalizer, spectrum analyzer, and A/D converter, respectively. The elements designated thereon as "27", "IC20", "IC21" and "IC25" are the associated circuitry.

All the elements shown on the detailed interconnection circuit diagrams of Appendix "A" are standard integrated circuits and their industry-wide part numbers are also indicated thereon. In particular, the elements "IC7" and "IC1" are available from Interstate Electronics Corp., Voice Products Operations, 1001 E. Ball Road, Anaheim, Calif. 92803 as a two-chip voice recognition set model VRC100, part numbers ASA-16, "Audio Spectrum Analyzer and 16-Channel Multiplexer," and 68B03, "Speech Recognizer/Controller," respectively. A complete description of these elements, as well as the entire circuit of frame one (1) of Appendix "A" can be had by reference to Schematic/Logic Diagram VRC100-2/VRC100-2A Evaluation Kit, Sheets 1/5 through 5/5, in publication TMP00701949, "Voice Recognition Chip Set Model VRC100 Series-Technical Data", Revision 1, copyrighted Interstate Electronics Corp, Feb. 15, 1983.

Referring again to the block diagram of FIG. 1, audio signal processor 20 is connected to a voice recognition element 40 which receives the digital representation of the audio signals received on the handset 30 as processed by audio signal processor 20. Voice recognizer 40 is shown on the upper portion of frame one (1) of Appendix "A" and consists of a speech recognizer/controller ("IC1" thereon), an erasable programmable read only memory (EPROM) ("IC6" thereon), random access memories (RAM's) ("IC2", "IC3", "IC4", and "IC5" thereon), and associated circuitry.

EPROM IC6 firmware accommodates seventeen user commands and the processing algorithms thereof. Vocabulary templates are stored in RAMs IC2, IC3, IC4, and IC5 providing for up to 83 user-supplied words or phrases which can be recognized. Speech recognizer/controller IC1 is a special-purpose digital microprocessor which executes the firmware stored in EPROM IC6 and provides control of the 16-channel analog spectrum analyzer IC7 and the 8-bit A/D converter IC8. Speech recognizer/controller IC1 accesses the vocabulary templates stored in RAMs IC2, IC3, IC4 and IC5 and can add to, change, or delete the templates as necessitated by user-initiated additions, changes, deletions of names and dialing numbers. Input/Output (I/O) data latch IC11 and 3-to-eight line decoders IC14, IC15 and IC16 facilitate data transfer between the audio signal processor 20 and the voice recognizer 40.

Referring again to FIG. 1, the voice recognizer 40 is connected to a controller 50 (via I/O data latches IC9 and IC10 of frame one (1) of Appendix "A"). Signals generated by the speech recognizer/controller element of voice recognizer 40 are received by the controller 50 which executes the various operations vocally communicated to the telephone device 10 by the user via handset 30 and converted into a digital data stream by the audio signal processor 20 and the voice recognizer 40. Controller 50 is shown on the upper portion of frame two (2) of Appendix "A" and consists of a general purpose microprocessor ("IC28" thereon), RAM ("IC29" and "IC30" thereon), and associated circuitry.

Controller 50 is connected to an eight-character light-emitting diode (LED) display 60 and to a standard telephonic interface 70 and in response to the digital data stream received by processor IC28 executes the software utility routines stored in the RAMs IC29 and IC30 which cause information to be displayed, and phone calls to be placed or terminated.

Controller 50 is of conventional design and employs a standard 8-bit microprocessor "IC28" available from Intel Corp., 3065 Bowers Avenue, Santa Clara, CA 95051 as part number 8049. A complete description of the element IC28, as well as the circuit of frame two (2) of Appendix "A" consisting generally of the upper portion (with the exception of display driver "IC31") can be had by reference to "Microprocessor Peripherals UPI Users Manual," published by Intel Corporation, Literature Department SV3-3, 3065 Bowers Avenue, Santa Clara, Calif. 95051, copyrighted 1982. A listing of the utility routines executed by microprocessor IC28 is appended hereto as microfiche Appendix "B".

The LED display 60 consists of a seven-segment LED driver ("IC31" on frame two (2) of Appendix "A") and two standard 4-character seven-segment LED displays connected in a conventional manner as shown on frame two (2) of Appendix "A". A serial data port of microprocessor IC28 (pin P20) is connected to a data input of LED driver "IC31" and the microprocessor IC28 provides signals which cause information to be displayed thereon, as will be described below.

Microprocessor IC28 also supplies dialing signals to the telephonic interface 70 via the 8-bit data port of I/O data latch U37 (pins 2,5,6,8,12,15,16 and 19). Telephonic interface 70 (shown on the upper portion of frame three (3) of Appendix "A") includes a standard dialer pulse-former integrated-circuit 5089 ("IC32" thereon) which receives from microprocessor IC28 via latch IC18 the dialing signals representing the telephone number of a call to be placed and generate the proper pulse sequence and also includes standard circuitry for establishing a two-way audio circuit between the external telephone lines and the handset 30, as will be understood by those skilled in the art.

The remaining circuitry shown on frame two (2) of Appendix "A" consists of a standard twelve-key keyboard shown within the dashed square in the lower left-hand portion thereon and a set of four normally-open contacts, denoted "HOOK", "TRAIN", "RETRAIN" and "TRAINER" thereon. The function of these elements will be described below. The remaining circuitry shown on frame three (3) of Appendix "A" consists of a 5-volt IC power supply and a battery back-up therefore. These are shown in the lower-half portion of frame three (3) of Appendix "A" and are of conventional design as will be appreciated by those skilled in the art.

With reference to FIG. 2, a physical embodiment of voice-controlled telephone 10 includes a base 100 housing all the components shown on Appendix "A." A twelve-key telephone keyboard 110, a handset 120, with a built-in speaker 125 and microphone 130, a reset pushbutton 140, a train pushbutton 150, a user-select pushbutton 160, a retrain pushbutton 170, and an 8-character LED display 180. (Handset 30 and display 60 of FIG. 1 are designated handset 120 and display 180, respectively, in FIG. 2). Speaker 125 is shown on frame three (3) of Appendix "A" and denoted "SP" thereon. Microphone 130 is shown on frame one (1) of Appendix "A" and denoted "MIC 034CY" thereon.

The voice-controlled telephone 10 is provided with the pushbuttons 150, 160 and 170 and the microprocessor IC28 which, in conjunction with the various utility routines used by the microprocessor IC28, and the voice commands, the telephone 10 performs the functions to be described hereinafter. Table I, below, is an index of the various microprocessor routines contained in the microfiche Appendix "B". The functions the telephone 10 can perform will be described with reference to the specific routine of Appendix "B" which microprocessor IC28 executes to cause the actions described.

TABLE I

| Index to Utility Routines | | |
|---|---|---|
| Name | Frame Routine Begins On | Symbolic Location |
| MAIN PROGRAM | 2 | — |
| TIMER INTERRUPT | 2 | — |
| UPDATE DISPLAY | 2 | TINT15 |
| UPDATE CLOCK | 4 | TIN110 |
| DISPLAY DIGITS | 5 | TIN140 |
| — | 6 | START |
| FIRST STARTUP | 6 | STAR05 |
| — | 7 | MAIN |
| CHANGE PERSON | 8 | PUS |
| SET DISPLAY TO TIME | 8 | MAIN01 |
| — | 9 | MAIN02 |
| SET DISPLAY TO "PHONE" | 9 | READY |
| — | 11 | RECALL |
| — | 11 | DIAL1 |
| LEARN | 13 | LEN0 |
| SET TRAINING MODE | 14 | TRAIN1 |
| GETNUMB | 15 | GETNU5 |

TABLE I-continued
Index to Utility Routines

| Name | Frame Routine Begins On | Symbolic Location |
|---|---|---|
| TRAINWORD | 17 | TWORD |
| FULLISTEN | 19 | FULLI |
| SETNUMB | 19 | SETNUM |
| — | 20 | LOUTPUT |
| — | 20 | OUTPUT |
| SCAN FOR BYTE FROM VRC | 21 | SCNVRC |
| — | 23 | PAD |
| GENERATE TONE | 24 | TONE |
| WORDOUT | 29 | WORDOU |
| SET TIME CLOCK | 40 | TIMEST |

When first plugged into a source of power, telephone 10 will display six digits on LED display 180, representing the time in hours, minutes and seconds, and the user number, under control of microprocessor IC28. The MAIN program initiates this action by a transfer to symbolic location START. Reset button 140 can be pressed if the time digits and user number are not displayed. Microprocessor IC28 of controller 50 is provided with a crystal oscillator- and capacitor-controlled clock and during the telephone 10 "rest" mode the microprocessor generates standard time digits at the serial data port (pin P20) which are communicated to the display driver IC31 of display 60 for visual display on LED display 180. (TIMER INTERRUPT routine performs these functions.)

To effect operation of the voice-actuated telephone device 10, the handset 120 is picked up and train pushbutton 150 is pressed which causes the device to leave the "rest" mode and enter the voice-controlled training mode. Under control of the routine beginning at location READY, the information "DIAL—4" will be displayed on LED display 180. The repetition number "4" is a cue to the user to repeat the word "DIAL" four times. Each time the word "DIAL" is uttered into the microphone 130 in the mouthpiece of handset 120 and communicated via audio signal processor 20 to voice recognizer 40 and recognized thereby, a visual verification will be indicated on display 180 by decreasing the number shown by one, i.e. from "4" to "3" to "2" to "1" and then to "0". In all cases, the user must speak the displayed word until the numeral has been down-counted to zero.

The process of displaying the word "DIAL" and the repetition number is controlled by the microprocessor IC28 of controller 50 executing utility subroutine "TRAINWORD" of Appendix "B." By executing this routine, voice recognizer 40 communicates each recognition of the word "DIAL" as stored in template RAMs IC2, IC3, IC4 and IC5 under control of the EPROM IC6 to microprocessor IC28 which reduces the number displayed by one and causes reexecution of the utility subroutine by the voice recognizer 40.

Following the recognition of the word "DIAL" four times, the repetition numeral "4" preceded by the second word in the command word repertoire of seventeen commands stored in template RAMs IC2, IC3, IC4 and IC5 will be displayed on display 180. In the train mode, each of the seventeen command words or numerals zero through nine will be displayed and the user will be prompted to speak the displayed word or numeral so that it is recognized by voice recognition element 40 a total of four times.

The voice-controlled telephone 10 is provided with the retrain pushbutton 170 which permits the user to retrain the voice recognition element 40 on a particular one of the seventeen command words or numerals by repeatedly depressing the pushbutton 170 until the particular word or numeral appears on the display 180 followed by the repetition number. The user then performs the training process on this particular word or numeral as just described, in regard to the initial training.

Following the training procedure, the display 180 will go blank under control of microprocessor IC28 and the user can then speak the desired number to be dialed, digit-by-digit. Under control of routine SETNUMB each digit will be communicated to the voice recognizer 40 and visually displayed on display 180 as each digit is recognized as one of the ten digits stored in the template RAMs. The displayed phone number will be shifted left one digit as each subsequent digit is recognized and displayed in the right-most position of display 180. If at any point a digit is recognized and displayed incorrectly, the user will see the incorrect digit in the right-most position of the display 180 and can correct the digit by speaking the work "BACK" and then speaking the correct digit.

Once the correct number has been enunciated and displayed and under control of the routine beginning at location DIAL1, the user is to speak the work "DIAL" and the controller 50 will generate the appropriate dialing signals to the telephonic interface 70, which will proceed to initiate the call. If the number dialed is busy, the user can hang up. This will cause the time and user number to once again be displayed on display 180 which verifies that the call has been terminated.

To redial the most-recently dialed number under the control of the routine beginning at location RECALL, the user initiates a call by speaking "DIAL" four times followed by the word "RECALL" at which point the most-recently dialed number will be displayed on the display 180. The user then speaks the word "DIAL" which causes the displayed number to be redialed.

The voice-controlled telephone 10 of the present invention provides a voice-controlled learning feature which permits a user to build a list of commonly-called phone numbers which can be referenced by the name of the subscriber having that number. Under control of routine LEARN the user initiates this feature by speaking the word "LEARN" which causes the display 180 to display a repetition number, for example 8. Following this, the user is to utter the name of the subscriber she wishes to add to her list, for example "EMILY." After she says "EMILY" once, the displayed repetition number will be one less than that displayed originally, i.e., "7". The user is then to repeat the subscriber's name seven more times, each utterance will be recognized and visually verified by the repetition number being decreased by one. The user continues to repeat the name until the number is down-counted to zero.

At this point the display 180 will go blank and the user is to proceed as though she wanted Emily's number dialed. She would speak the desired number digit-by-digit and it will be displayed on display 180 as each digit is recognized, as described above. Once the correct number has been enunciated and displayed, the user says "DIAL" and the name and number is added to her list of commonly-called numbers.

To make use of this list, the user would place a call to Emily by uttering the word "EMILY", at which point Emily's number will appear on the display 180, she then initiates the call by saying the word "DIAL." The voice-controlled telephone of the instant invention does not limit a subscriber's name to a single word. The name may consist of a phrase such as "SMITH_HARDWARE."

Entries in a user's list of commonly-called numbers can be altered by voice control. The user initiates this feature by lifting the handset 120 and speaking the word "FORGET," which causes the word "FORGET" to be displayed on the display 180. She then speaks the phone number desired to be altered, digit-by-digit. Following this, the phone number to be altered can be viewed by saying the word "DIAL." By restating the word "FORGET," the current phone number associated with the subscriber is deleted. A repetition numeral "4" is now displayed on the display 180 indicating the number of times the subscriber's name is to be uttered and recognized. Following the down-counting of the repetition numeral to zero, the new phone number is entered digit-by-digit as described above.

While the above description of the voice-controlled telephone of the instant invention is illustrative of one possible method of use, it is understood that a wide variety of methods of voice-control are within the scope of the invention. Since the voice recognizer 40 can accommodate up to a total of a 100-word vocabulary, the use of the template words "FORGET", "ONE", "TWO",..., "NINE", "ZERO", "RECALL", and "DIAL" are merely illustrative templates and each user can voice-program the device according to his or her own needs, and in conjunction, utilize various visual displays other than those described above.

The voice-controlled telephone 10 is provided with a user select pushbutton 160 which permits the use of the telephone of the instant invention by up to four different users, each conducting his or her own training of the telephone and each having his or her own list of commonly-called subscribers.

As mentioned, when the telephone 10 is first plugged in to a source of power, the time digits are displayed on display 180 followed by a user number. Should this user have a different number than than displayed, user select pushbutton 160 may be depressed which causes the displayed user number to increment. Depressing the pushbutton 160 while the user number "4" is displayed will cause the user number of "1" to be next displayed.

Keyboard 110 can be used independently of the voice-control method of dialing to enter a telephone number which is to be dialed by the telephone 10.

What is claimed is:

1. In a spoken word controlled repertory dialing apparatus capable of operating in either a programming mode or a normal mode including voice recognition means for recognizing predetermined input words communicated thereto and visual display means responsive to said voice recognition means for displaying prompt and subscriber phone number information to the user, the method of establishing a telephonic connection comprising the steps of:
   (a) manually selecting said programming mode of operation;
   (b) displaying on said visual display means a first predetermined prompt word followed by a predetermined repetition numeral;
   (c) uttering said prompt word a number of times equal to said repetition numeral and decrementing said numeral after each recognized utterance of said first prompt word, until said numeral has been decremented to zero;
   (d) repeating steps (b) and (c) a predetermined number of times;
   (e) entering said normal mode of operation;
   (f) uttering the digits of the subscriber phone number to be called digit-by-digit, and displaying on said visual display each of said digits; and
   (g) uttering a predetermined word which when recognized causes said displayed subscriber phone number to be dialed and a telephonic connection to be established between said dialing apparatus and an external telephone subscriber line.

2. The telephone calling method according to claim 1 wherein step (f) further calls for correcting the most-recently uttered digit of said displayed subscriber phone number by uttering a predetermined word causing said digit to be deleted from said displayed number and the correct digit to be next uttered.

3. In a spoken word controlled repertory dialing apparatus capable of operating in either a programming mode or a normal mode including voice recognition means for recognizing predetermined input words communicated thereto and visual display means for displaying prompt and subscriber name and phone number information to the user, the method of establishing a subscriber telephone number repertory comprising the steps of:
   (a) manually selecting said programming mode of operation;
   (b) displaying on said visual display means a first predetermined prompt word followed by a first predetermined repetition numeral;
   (c) uttering said first prompt word a number of times equal to said first repetition numeral and decrementing said first numeral after each recognized utterance of said first prompt word, until said first numeral has been decremented to zero;
   (d) repeating steps (b) and (c) a predetermined number of times;
   (e) entering said normal mode of operation;
   (f) uttering a second predetermined prompt word;
   (g) displaying on said visual display means a second predetermined repetition numeral;
   (h) uttering a subscriber name a number of times equal to said second repetition numeral and decrementing said second numeral after each recognized utterance of said subscriber name;
   (i) displaying on said visual display a blank display after said second numeral has been decremented to zero;
   (j) uttering the digits of the subscriber phone number to be associated with said subscriber name digit-by-digit, and displaying on said visual display each of said digits; and
   (k) uttering a predetermined word which when recognized causes said displayed subscriber telephone number to be established together with said subscriber name in said subscriber telephone number repertory.

4. In a spoken word controlled repertory dialing apparatus capable of operating in either a programming mode or a normal mode including voice recognition means for recognizing predetermined input words communicated thereto and visual display means responsive to said voice recognition means for displaying prompt and subscriber name and phone number information to the user, the method of establishing a telephonic connection with a subscriber comprising comprising the steps of:
(a) manually selecting said programming mode of operation;
(b) displaying on said visual display means a first predetermined prompt word followed by a first predetermined repetition numeral;
(c) uttering said first prompt word a number of times equal to said first repetition numeral and decrementing said numeral after each recognized utterance of said first prompt word, until said first numeral has been decremented to zero;
(d) repeating steps (b) and (c) a predetermined number of times;
(e) entering said normal mode of operation;
(f) uttering a second predetermined prompt word;
(g) displaying on said visual display means a second predetermined repetition numeral;
(h) uttering a subscriber name a number of times equal to said second repetition numeral and decrementing said second numeral after each recognized utterance of said subscriber name;
(i) displaying on said visual display a blank display after said second numeral has been decremented to zero;
(j) uttering the digits of the subscriber phone number to be associated with said subscriber name digit-by-digit, and displaying on said visual display each of said digits;
(k) uttering said subscriber name;
(l) displaying on said visual display said subscriber telephone number after said subscriber name has been recognized; and
(m) uttering said predetermined word which when recognized causes said displayed subscriber phone number to be dialed and a telephonic connection to be established between said dialing apparatus and an external telephone subscriber line.

5. The telephone calling method according to claim 4 further including the redialing steps of:
(n) uttering a third predetermined prompt word causing said subscriber phone number displayed at step (l) to be redisplayed on said visual display; and
(o) uttering said predetermined word of step (m) causing said redisplayed subscriber phone number to be redialed and a telephonic connection to be established between said dialing apparatus and an external telephone subscriber line.

6. The telephone calling method according to claim 4 wherein said subscriber name consists of a plurality of words.

7. In a spoken word controlled repertory dialing apparatus capable of operating in either a programming mode or a normal mode including voice recognition means for recognizing predetermined input words communicated thereto and visual display means responsive to said voice recognition means for displaying prompt and subscriber name and phone number information to the user, the method of altering an entry made in said subscriber telephone number repertory comprising the steps of:
(a) manually selecting said programming mode of operation;
(b) displaying on said visual display means a first predetermined prompt word followed by a first predetermined repetition numeral;
(c) uttering said first prompt word a number of times equal to said first repetition numeral and decrementing said first numeral after each recognized utterance of said first prompt word, until said first numeral has been decremented to zero;
(d) repeating steps (b) and (c) a predetermined number of times;
(e) entering said normal mode of operation;
(f) uttering a second predetermined prompt word;
(g) displaying on said visual display means a second predetermined repetition numeral;
(h) uttering a subscriber name a number of times equal to said second repetition numeral and decrementing said second numeral after each recognized utterance of said subscriber name;
(i) displaying on said visual display a blank display after said numeral has been decremented to zero;
(j) uttering the digits of the subscriber phone number to be associated with said subscriber name digit-by-digit, and displaying on said visual display each of said digits;
(k) uttering a third predetermined prompt word which when recognized causes said third prompt word to be displayed on said visual display means;
(l) uttering the subscriber phone number to be altered digit-by-digit;
(m) uttering a fourth predetermined prompt word which when recognized causes said subscriber phone number to be altered to be displayed on said visual display means;
(n) uttering said third predetermined prompt word which when recognized causes a third predetermined repetition numeral to be displayed on said visual display means;
(o) uttering the subscriber name associated with said phone number a number of times equal to said third repetition numeral and decrementing said third numeral after each recognized utterance of said subscriber name, until said third numeral has been decremented to zero;
(p) uttering the digits of the new phone number to be associated with said subscriber name digit-by-digit, and displaying on said visual display means each of said digits; and
(q) uttering said fourth predetermined prompt word which when recognized causes said displayed subscriber telephone number to be established together with said subscriber name in said subscriber telephone number repertory.

8. The telephone calling method according to claim 1 wherein said voice recognition means is responsive to a plurality of users, wherein step (a) further calls for manually selecting one from among said plurality of users, and wherein said predetermined prompt word of step (b) is a predetermined user numeral.

* * * * *